US012602736B2

(12) United States Patent
Chen et al.

(10) Patent No.: US 12,602,736 B2
(45) Date of Patent: Apr. 14, 2026

(54) GRAPHICS PROCESSING DEVICE AND METHOD

(71) Applicant: Acer Incorporated, New Taipei City (TW)

(72) Inventors: Kuan-Ju Chen, New Taipei City (TW); Chao-Kuang Yang, New Taipei City (TW)

(73) Assignee: ACER INCORPORATED, New Taipei City (TW)

( * ) Notice: Subject to any disclaimer, the term of this patent is extended or adjusted under 35 U.S.C. 154(b) by 235 days.

(21) Appl. No.: 18/519,602

(22) Filed: Nov. 27, 2023

(65) Prior Publication Data

US 2024/0177263 A1    May 30, 2024

(30) Foreign Application Priority Data

Nov. 29, 2022    (TW) .................................. 111145555

(51) Int. Cl.
G06T 1/20            (2006.01)
(52) U.S. Cl.
CPC ...................................... G06T 1/20 (2013.01)
(58) Field of Classification Search
CPC ....................................................... G06T 1/20
(Continued)

(56) References Cited

U.S. PATENT DOCUMENTS 10,755,376 B2    8/2020  Viggers et al.
2008/0211816 A1 *  9/2008  Gonzalez ................... G06F 3/14
345/505

(Continued)

FOREIGN PATENT DOCUMENTS

CN          110136230  A      8/2019
CN          113822962  A      12/2021
(Continued)

OTHER PUBLICATIONS

Zhang Yi-lei, Animation display method and device, electronic equipment and storage medium , Aug. 16, 2019, Beijing Dajia Interconnection Information Tech Co Ltd , CN110136230 (A) , paras. 87-170, Figs. 1-3,5, English.*

(Continued)

*Primary Examiner* — Prabodh M Dharia

(74) *Attorney, Agent, or Firm* — McClure, Qualey & Rodack, LLP

(57)                ABSTRACT

A graphics processing device is provided in the invention. The graphics processing device includes a storage device, a processing circuit and a calculation circuit. The storage device stores a plurality of applications. The processing circuit is coupled to the storage device and configured to install and execute the applications. The calculation circuit is coupled to the storage device and the processing circuit. When one of the applications is installed in the storage device by the processing circuit, the calculation circuit determines whether to deploy a graphics application interface (Graphics API) for the application. When the calculation circuit determines that the Graphics API needs to be deployed for the application, the calculation circuit determines whether to transform the first Graphics API corresponding to the application into a second Graphics API supporting multi-thread operations.

14 Claims, 3 Drawing Sheets

(58) Field of Classification Search
USPC .................................. 345/505, 522; 715/273
See application file for complete search history.

(56) References Cited

U.S. PATENT DOCUMENTS

| | | | | |
|---|---|---|---|---|
| 2014/0059426 A1* | 2/2014 | Lee | G06F 40/106 | |
| | | | | 715/273 |
| 2015/0302546 A1* | 10/2015 | Balci | G06T 11/40 | |
| | | | | 345/522 |
| 2018/0349146 A1* | 12/2018 | Iwamoto | G06F 9/461 | |
| 2019/0019267 A1* | 1/2019 | Suresh | G06F 9/5066 | |
| 2021/0065657 A1* | 3/2021 | Zhang | G06T 1/20 | |
| 2021/0182058 A1* | 6/2021 | Kaul | G06F 7/483 | |
| 2021/0201438 A1* | 7/2021 | Appu | G06N 3/063 | |
| 2022/0148123 A1* | 5/2022 | Lyer | A63F 13/355 | |
| 2022/0391252 A1 | 12/2022 | Chen et al. | | |

FOREIGN PATENT DOCUMENTS

| | | |
|---|---|---|
| CN | 114494547 A | 5/2022 |
| TW | 1779640 B | 10/2022 |

OTHER PUBLICATIONS

Zhang Yi-lei, Animation display method and device, electronic equipment and storage medium , Aug. 16, 2019, Beijing Dajia Interconnection Information Tech Co Ltd , CN110136230 (A) , paras. 87-170, Figs. 1-3,5, Tiwanese.*
Chinese language office action dated Aug. 29, 2023, issued in application No. TW 111145555.

* cited by examiner

GRAPHICS PROCESSING DEVICE AND METHOD

CROSS REFERENCE TO RELATED APPLICATIONS

This application claims priority of TW Patent Application No. 111145555 filed on Nov. 29, 2022, the entirety of which is incorporated by reference herein.

BACKGROUND OF THE INVENTION

Field of the Invention

The invention generally relates to graphics processing technology, and more particularly, to a graphics processing technology for transforming a graphics application interface (Graphics API).

Description of the Related Art

The recent versions of the Windows operating system (e.g., Windows 11) may support Linux Graphics API, such as OpenGL, OpenGL ES or Vulkan. Therefore, applications that are based on Linux or Android can be run on the Windows operating system.

The Graphics API corresponding to the legacy application may not support multi-thread operations (e.g., DirectX 7, DirectX 9, OpenGL, OpenGL ES, and so on). Therefore, how to apply the Graphics API supporting multi-thread operations (e.g., Vulkan) to the legacy application is a subject worthy of discussion.

BRIEF SUMMARY OF THE INVENTION

A graphics processing device and method are provided to overcome the problems mentioned above.

An embodiment of the invention provides a graphics processing device. The graphics processing device includes a storage device, a processing circuit and a calculation circuit. The storage device stores a plurality of applications. The processing circuit is coupled to the storage device and configured to install and execute the applications. The calculation circuit is coupled to the storage device and the processing circuit. When one of the applications is installed in the storage device by the processing circuit, the calculation circuit determines whether to deploy a graphics application interface (Graphics API) for the application. When the calculation circuit determines that the Graphics API needs to be deployed for the application, the calculation circuit determines whether to transform the first Graphics API corresponding to the application into a second Graphics API supporting multi-thread operations.

In an embodiment, the processing circuit is a Central Processing Unit (CPU). In an embodiment, the calculation circuit is configured in a Discrete Graphics Processing Unit (DGPU) or an Integrated Graphics Processing Unit (IGPU).

In an embodiment, the calculation circuit determines whether the number of file folders in a specific path is increased. When the calculation circuit determines that the number of file folders in the specific path is increased, the calculation circuit determines whether deploy the Graphics API for the installed application by determining whether files in the increased file folders comprise a file with a file name that corresponds to a specific file type.

In an embodiment, when the processing circuit executes the installed application, the calculation circuit determines the call address of each thread corresponding to the installed application. When the number of threads whose call address corresponds to a GPU Driver or a GPU Device is not above the threshold, the calculation circuit transforms the first Graphics API into a second Graphics API supporting multi-thread operations.

In an embodiment, the second Graphics API is Vulkan.

An embodiment of the invention provides a graphics processing method. The graphics processing method is applied to a graphics processing device. The graphics processing method includes the following steps. When one of the applications is installed in the storage device of a graphics processing device by a processing circuit of the graphics processing device, the calculation circuit of the graphics processing device determines whether to deploy a graphics application interface (Graphics API) for the application. Then, when the calculation circuit determines that the Graphics API needs to be deployed for the application, the calculation circuit determines whether to transform the first Graphics API corresponding to the application into a second Graphics API supporting multi-thread operations.

Other aspects and features of the invention will become apparent to those with ordinary skill in the art upon review of the following descriptions of specific embodiments of a graphics processing device and method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
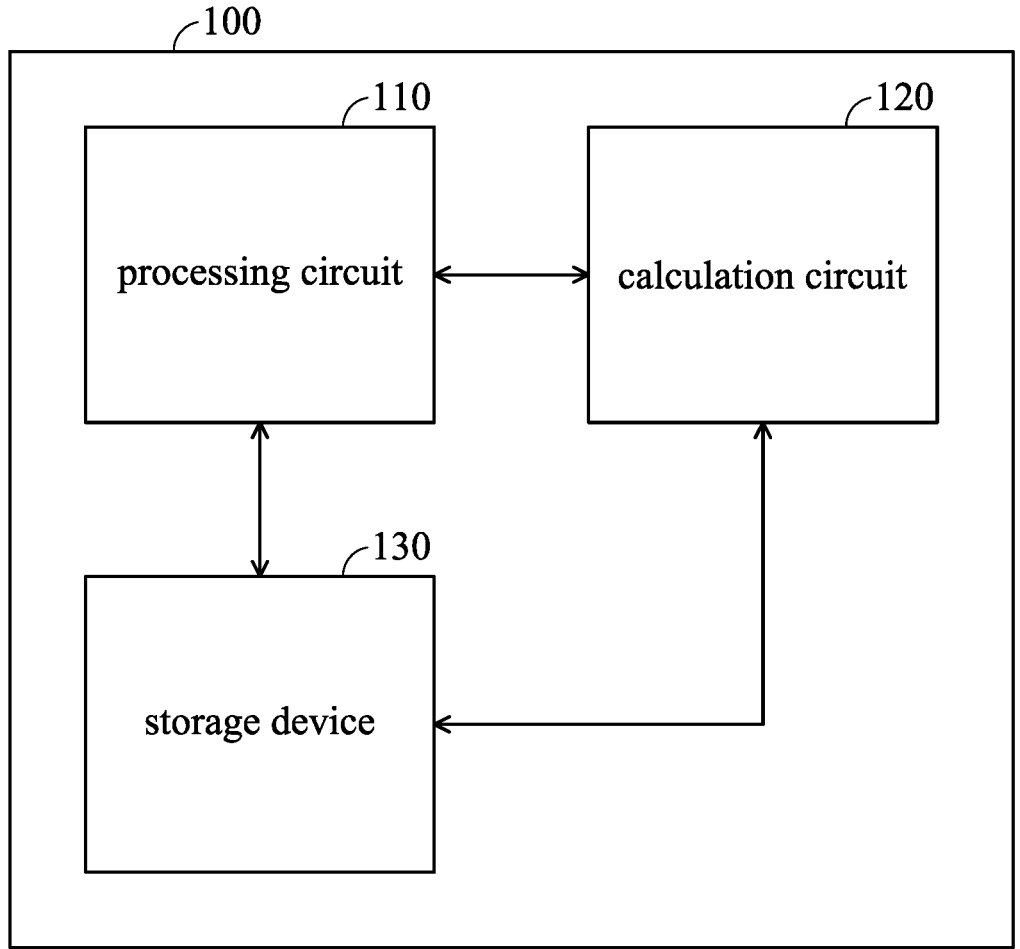
FIG. 1 is a block diagram of a graphics processing device 100 according to an embodiment of the invention.

FIG. 1 is a block diagram of a graphics processing device 100 according to an embodiment of the invention. As shown in FIG. 1, the graphics processing device 100 may comprise a processing circuit 110, a calculation circuit 120 and a storage device 130. It should be noted that FIG. 1 presents a simplified block diagram in which only the elements relevant to the invention are shown. However, the invention should not be limited to what is shown in FIG. 1. The graphics processing device 100 may also comprise other elements.

According to an embodiment of the invention, the processing circuit 110 may be a Central Processing Unit (CPU). According to an embodiment of the invention, the calculation circuit may be configured in a Discrete Graphics Processing Unit (DGPU) or an Integrated Graphics Processing Unit (IGPU).

According to the embodiments of the invention, the storage device 130 may store the software and firmware program codes, system data, user data, etc. of the graphics processing device 100. The storage device 130 may be a volatile memory (e.g. Random Access Memory (RAM)), or a non-volatile memory (e.g. flash memory, Read Only Memory (ROM)), a hard disk, or a combination of the above memory devices. The storage device 110 may store the required files and data for the image classification.

According to an embodiment of the invention, the calculation circuit 120 may determine that the number of file folders in a specific path (e.g., C:\Program Files or C:\Program Files (x86), but the invention should not be limited thereto) is increased to determine whether new application is installed in the storage device 130. When the number of file folders in the specific path is increased (i.e., the processing circuit 110 installs new application to the storage device 130), the calculation circuit 120 may determine whether the files in the increased file folders comprise the file with the file name that corresponds to the specific file type (e.g., d3d7.dll, d3d9.dll, GLES.dll or GL.dll, but the invention should not be limited thereto).

When the calculation circuit 120 determines that the files in the increased file folders comprise the file with the file name that corresponds to the specific file type, the calculation circuit 120 may determine that a graphics application interface (Graphics API) needs to be deployed for the installed application. That is to say, the calculation circuit 120 is able to determine whether the installed application needs to use the Graphics API based on the file names.

According to an embodiment of the invention, when the calculation circuit 120 determine that a Graphics API needs to be deployed for the installed application (i.e., the installed application needs to use the Graphics API), the calculation circuit 120 may directly determine whether to transform a first Graphics API corresponding to the installed application into a second Graphics API (e.g., Vulkan) supporting multi-thread operations. When the calculation circuit 120 determines that the first Graphics API needs to be transformed into a second Graphics API which supports multi-thread operations to increase the graphics processing performance, the calculation circuit 120 may directly transform the first Graphics API into a second Graphics API which supports multi-thread operations. For example, if the calculation circuit 120 determines that the first Graphics API does not support multi-thread operations (e.g., the first Graphics API may be a legacy Graphics API, such as DirectX 9, OpenGL or OpenGL ES, but the invention should not be limited thereto), the calculation circuit 120 may directly transform the first Graphics API into a second Graphics API supporting multi-thread operations to increase the graphics processing performance.

According to another embodiment of the invention, when the calculation circuit 120 determine that a Graphics API needs to be deployed for the installed application, the calculation circuit 120 may ask the user of the graphics processing device 100 whether the first Graphics API corresponding to the installed application needs to be transformed into a second Graphics API supporting multi-thread operations. For example, the calculation circuit 120 may indicate a display device (not shown in figures) of the graphics processing device 100 to display a window to ask the user. When the user wants to transform the first Graphics API into a second Graphics API which supports multi-thread operations, based on the indication input by the user, the calculation circuit 120 may transform the first Graphics API into a second Graphics API which supports multi-thread operations. When the user does not want to transform the first Graphics API into a second Graphics API which supports multi-thread operations, the calculation circuit 120 may determine whether the first Graphics API needs to be transformed into a second Graphics API which supports multi-thread operations again until the processing circuit 110 executes the installed application.

Specifically, in the embodiment, when the processing circuit 110 executes the installed application, the calculation circuit 120 may obtain the process name of the application and the thread names (e.g., a thread list) of the threads of the application. Then, the calculation circuit 120 may determine the call address of each thread, and determine whether the number of threads whose call address corresponds to a GPU Driver or a GPU Device is above the threshold (e.g., 1).

According to an embodiment of the invention, when the calculation circuit 120 determines that the number of threads whose call address corresponds to a GPU Driver or a GPU Device is above the threshold (e.g., higher than 1) (i.e., the first Graphics API also supports multi-thread operations), the calculation circuit 120 may determine that the first Graphics API does not need to be transformed into a second Graphics API supporting multi-thread operations. When the calculation circuit 120 determines that the number of threads whose call address corresponds to a GPU Driver or a GPU Device is not above the threshold (e.g., equal to 1) (i.e., the first Graphics API may be a legacy Graphics API, such as DirectX 9, OpenGL or OpenGL ES, but the invention should not be limited thereto), the calculation circuit 120 may determine that the first Graphics API needs to be transformed into a second Graphics API supporting multi-thread operations. In another embodiment, when the calculation circuit 120 determines that the first Graphics API needs to be transformed into a second Graphics API which supports multi-thread operations, the calculation circuit 120 may ask the user of the graphics processing device 100 whether the first Graphics API needs to be transformed into a second Graphics API which supports multi-thread operations. Only when the user wants to transform the first Graphics API into a second Graphics API which supports multi-thread operations, the calculation circuit 120 may transform the first Graphics API into a second Graphics API which supports multi-thread operations.

According to an embodiment of the invention, when the calculation circuit 120 transforms the first Graphics API corresponding to the installed application into a second Graphics API supporting multi-thread operations, the calculation circuit 120 may deploy the Graphics API Mapping Package to the specified path based on the file names of the files corresponding to the application to transform the first Graphics API into a second Graphics API supporting multi-thread operations. Specifically, based on the file names of the files corresponding to the application, the calculation circuit 120 may deploy suitable Graphics Driver, e.g., Zink or deploy suitable API Emulator, e.g., dxvk to transform the first Graphics API into a second Graphics API which supports multi-thread operations. For example, if the file names of the files corresponding to the application are associated with d3d7.dll or d3d9.dll (i.e., the first Graphics API is the Windows-based Graphics API), the calculation circuit 120 may deploy the dxvk to transform the first Graphics API into a Vulkan supporting multi-thread operations. In another example, if the file names of the files corresponding to the application are associated with GLES.dll or GL.dll (i.e., the first Graphics API is the Linux-based Graphics API), the calculation circuit 120 may deploy the Zink to transform the first Graphics API into a Vulkan which supports multi-thread operations.

Figure 2:
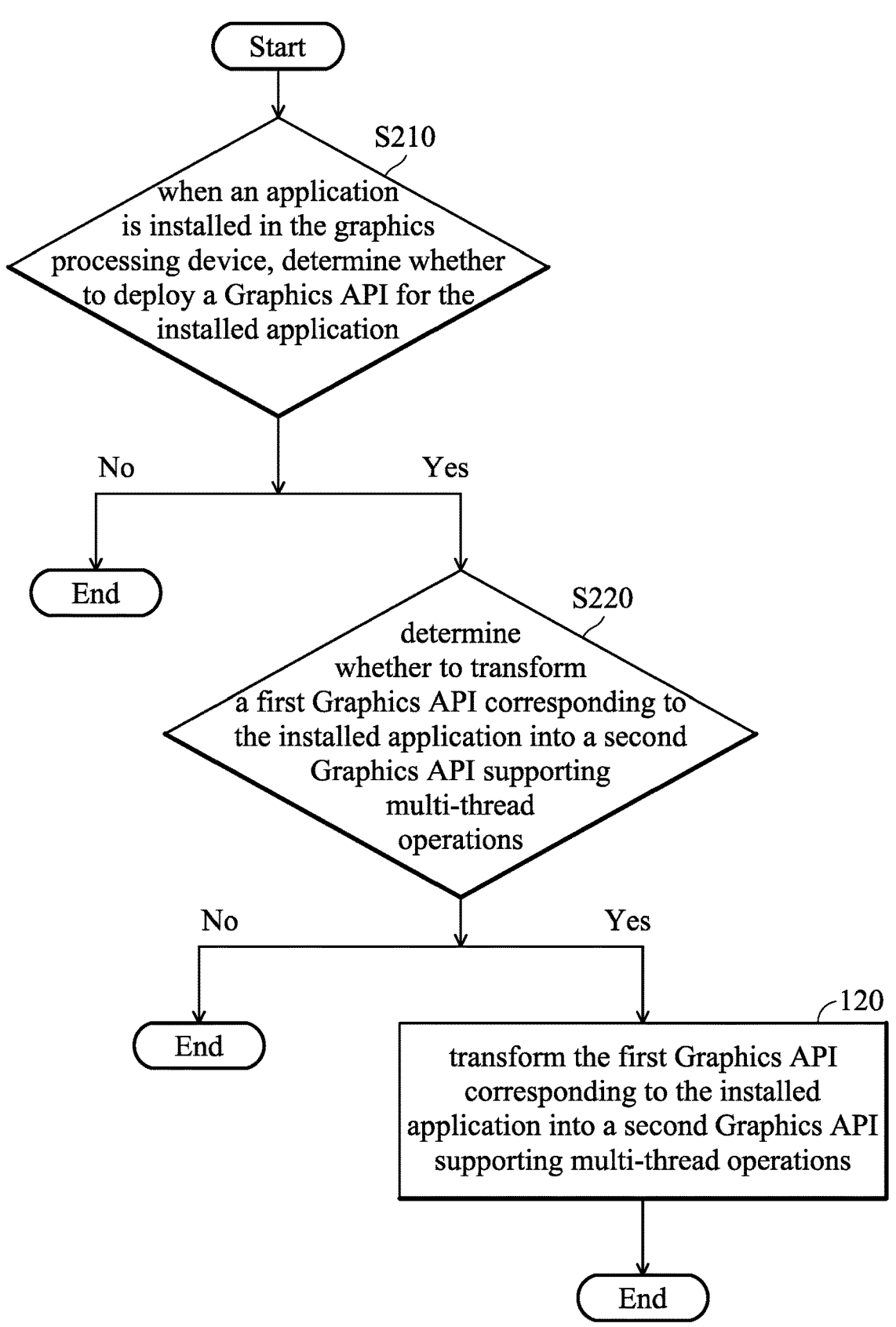
FIG. 2 is a flow chart illustrating a graphics processing method according to an embodiment of the invention.

FIG. 2 is a flow chart illustrating a graphics processing method according to an embodiment of the invention. The graphics processing method shown in FIG. 2 can be applied to the graphics processing device 100. As shown in FIG. 2, in step S210, when an application is installed by a processing circuit of the graphics processing device 100 in the storage device of a graphics processing device 100, the calculation circuit of the graphics processing device 100 may determine whether to deploy a Graphics API for the installed application.

When the calculation circuit of the graphics processing device 100 determines that the Graphics API does not need to be deployed for the installed application (i.e., the installed application does not need to use the Graphics API), the graphics processing method is terminated.

When the calculation circuit of the graphics processing device 100 determines that the Graphics API needs to be deployed for the installed application (i.e., the installed application needs to use the Graphics API), step S220 is performed. In step S220, the calculation circuit of the graphics processing device 100 may determine whether to transform a first Graphics API corresponding to the installed application into a second Graphics API supporting multi-thread operations.

When the calculation circuit of the graphics processing device 100 determines that the first Graphics API corresponding to the installed application does not need to be transformed into a second Graphics API supporting multi-thread operations, the graphics processing method is terminated.

When the calculation circuit of the graphics processing device 100 determines that the first Graphics API corresponding to the installed application needs to be transformed into a second Graphics API supporting multi-thread operations, step S230 is performed. In step S230, the calculation circuit of the graphics processing device 100 may transform the first Graphics API corresponding to the installed application into a second Graphics API supporting multi-thread operations.

Figure 3:
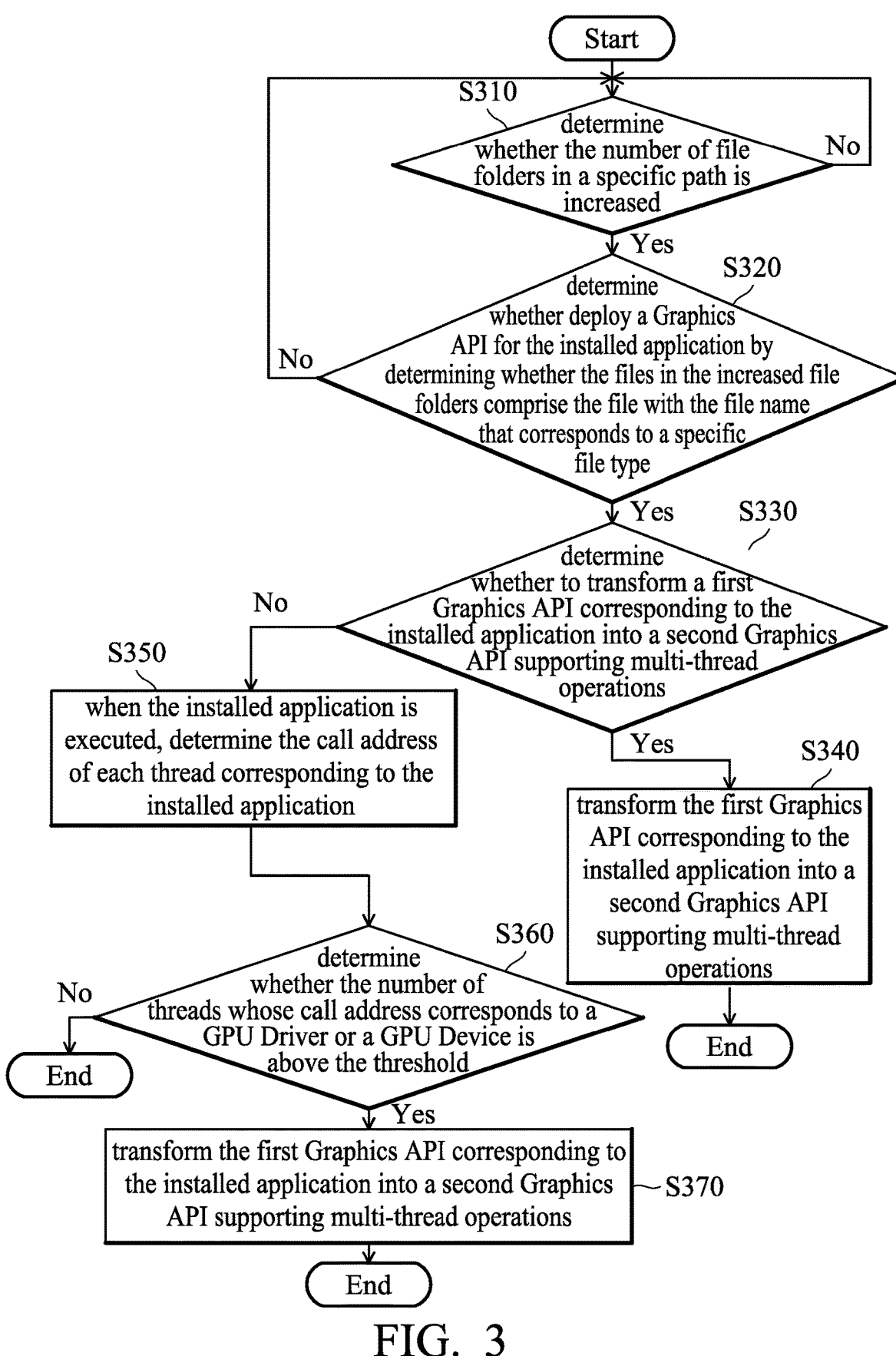
FIG. 3 is a flow chart illustrating a graphics processing method according to another embodiment of the invention.

FIG. 3 is a flow chart illustrating a graphics processing method according to another embodiment of the invention. The graphics processing method shown in FIG. 3 can be applied to the graphics processing device 100. As shown in FIG. 3, in step S310, the calculation circuit of a graphics processing device 100 may determine whether the number of file folders in a specific path is increased.

When the calculation circuit of the graphics processing device 100 determines that the number of file folders in a specific path is not increased (i.e., the graphics processing device 100 does not install new application), step S310 is performed again.

When the calculation circuit of the graphics processing device 100 determines that the number of file folders in a specific path is increased (i.e., the graphics processing device 100 installs new application), step S320 is performed. In step S320, the calculation circuit of the graphics processing device 100 may determine whether deploy a Graphics API for the installed application by determining whether the files in the increased file folders comprise the file with the file name that corresponds to a specific file type.

When the calculation circuit of the graphics processing device 100 determines that the files in the increased file folders does not comprise the file with the file name that corresponds to the specific file type (i.e., the installed application does not need to use the Graphics API), the graphics processing method returns to step S310.

When the calculation circuit of the graphics processing device 100 determines that the files in the increased file folders comprise the file with the file name that corresponds to the specific file type (i.e., the installed application needs to use the Graphics API), step S330 is performed. In step S330, the calculation circuit of the graphics processing device 100 may determine whether to transform a first Graphics API corresponding to the installed application into a second Graphics API supporting multi-thread operations.

When the calculation circuit of the graphics processing device 100 determines that the first Graphics API corresponding to the installed application needs to be transformed into a second Graphics API supporting multi-thread operations, step S340 is performed. In step S340, the calculation circuit of the graphics processing device 100 may transform the first Graphics API corresponding to the installed application into a second Graphics API supporting multi-thread operations.

When the calculation circuit of the graphics processing device 100 determines that the first Graphics API corresponding to the installed application does not need to be transformed into a second Graphics API supporting multi-thread operations, the calculation circuit of the graphics processing device 100 may not perform step S350 until the processing circuit of the graphics processing device 100 executes the installed application.

In step S350, when the processing circuit of the graphics processing device 100 executes the installed application, the calculation circuit of the graphics processing device 100 may determine the call address of each thread corresponding to the installed application.

In step S360, the calculation circuit of the graphics processing device 100 may determine whether the number of threads whose call address corresponds to a GPU Driver or a GPU Device is above the threshold.

When the calculation circuit of the graphics processing device 100 determines that the number of threads whose call address corresponds to a GPU Driver or a GPU Device is not above the threshold, step S370 is performed. In step S370, the calculation circuit of the graphics processing device 100 may transform the first Graphics API corresponding to the installed application into a second Graphics API supporting multi-thread operations.

When the calculation circuit of the graphics processing device 100 determines that the number of threads whose call address corresponds to a GPU Driver or a GPU Device is above the threshold, the flow is terminated.

According to the graphics processing method provided in the invention, when the application corresponds to the older Graphics API or to the Graphics API which does not support multi-thread operations, the graphics processing device is able to transform the legacy Graphics API or the Graphics API which does not support multi-thread operations into a Graphics API supporting multi-thread operations. Therefore, the processing performance of the Graphics Processing Unit (GPU) of the graphics processing device will be increased. In addition, according to the graphics processing method provided in the invention, when the GPU of the graphics processing device processes the operations of the legacy Graphics API or the Graphics API which does not support multi-thread operations, higher resolution will be able to be supported. Therefore, the user experience will be increased.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A graphics processing device, comprising:
a storage device, storing a plurality of applications;
a processing circuit, coupled to the storage device and configured to install and execute the plurality of applications; and
a calculation circuit, coupled to the storage device and the processing circuit, wherein when one of the plurality of applications is installed in the storage device by the processing circuit, the calculation circuit determines whether to deploy a graphics application interface (Graphics API) for the application;
wherein when the calculation circuit determines that the Graphics API needs to be deployed for the application, the calculation circuit determines whether to transform a first Graphics API corresponding to the application into a second Graphics API supporting multi-thread operations,
wherein when the processing circuit executes the installed application, the calculation circuit determines a call address of each thread corresponding to the application.

2. The graphics processing device of claim 1, wherein the processing circuit is a Central Processing Unit (CPU).

3. The graphics processing device of claim 1, wherein the calculation circuit is configured in a Discrete Graphics Processing Unit (DGPU) or an Integrated Graphics Processing Unit (IGPU).

4. The graphics processing device of claim 1, wherein the calculation circuit determines whether a number of file folders in a specific path is increased.

5. The graphics processing device of claim 4, wherein when the calculation circuit determines that the number of file folders in the specific path is increased, the calculation circuit determines whether deploy the Graphics API for the installed application by determining whether files in the increased file folders comprise a file with a file name that corresponds to a specific file type.

6. The graphics processing device of claim 1, wherein when a number of threads whose call address corresponds to a GPU Driver or a GPU Device is not above a threshold, the calculation circuit transforms the first Graphics API into the second Graphics API supporting the multi-thread operations.

7. The graphics processing device of claim 1, wherein the second Graphics API is Vulkan.

8. A graphics processing method, applied to a graphics processing device, comprising:
when one of the plurality of applications is installed in a storage device of the graphics processing device by a processing circuit of the graphics processing device, determining, by a calculation circuit of the graphics processing device, whether to deploy a graphics application interface (Graphics API) for the application; and
when the calculation circuit determines that the Graphics API needs to be deployed for the application, determining, by the calculation circuit, whether to transform a first Graphics API corresponding to the application into a second Graphics API supporting multi-thread operations,
wherein the method further comprises:
when the processing circuit executes the installed application, determining, by the calculation circuit, a call address of each thread corresponding to the application.

9. The graphics processing method of claim 8, wherein the processing circuit is a Central Processing Unit (CPU).

10. The graphics processing method of claim 8, wherein the calculation circuit is configured in a Discrete Graphics Processing Unit (DGPU) or an Integrated Graphics Processing Unit (IGPU).

11. The graphics processing method of claim 8, further comprising:
determining, by the calculation circuit, whether a number of file folders in a specific path is increased.

12. The graphics processing method of claim 11, further comprising:
when the calculation circuit determines that the number of file folders in the specific path is increased, determining, by the calculation circuit, whether to deploy the Graphics API for the installed application by determining whether files in the increased file folders comprise a file with a file name that corresponds to a specific file type.

13. The graphics processing method of claim 8, further comprising:
when a number of threads whose call address corresponds to a GPU Driver or a GPU Device is not above a threshold, transforming, by the calculation circuit, the first Graphics API into the second Graphics API supporting the multi-thread operations.

14. The graphics processing method of claim 8, wherein the second Graphics API is Vulkan.

* * * * *